United States Patent [19]
Urs

[11] Patent Number: 5,998,532
[45] Date of Patent: Dec. 7, 1999

[54] COLOR PIGMENTED MOISTURE CURING POLYURETHANE COATING HAVING AN ADJUSTABLE CURE TIME AND METHOD FOR PREPARING SAME

[76] Inventor: Bhaskar R. Urs, 1896 Hackberry La., Lake Forest, Ill. 60045

[21] Appl. No.: 09/003,529

[22] Filed: Jan. 6, 1998

[51] Int. Cl.$^6$ .............................. C08J 3/00; C08K 3/20; C08L 75/00; C08G 18/00

[52] U.S. Cl. .................. 524/507; 524/590; 524/265; 524/431; 524/451; 528/44; 528/48; 528/52; 528/53; 528/58; 528/59; 528/60; 528/65; 528/66; 528/84; 528/85

[58] Field of Search ...................... 524/590, 507, 524/265, 431, 451; 528/44, 48, 52, 53, 58, 59, 60, 65, 66, 85, 84

[56] References Cited

U.S. PATENT DOCUMENTS

| | | | |
|---|---|---|---|
| 4,304,706 | 12/1981 | Urs . | |
| 4,523,003 | 6/1985 | Bezwada | 582/60 |
| 5,128,423 | 7/1992 | Parrinello | 525/440 |
| 5,506,328 | 4/1996 | Chandalia et al. | 528/49 |

FOREIGN PATENT DOCUMENTS

WO 97/16467  5/1997  WIPO .

OTHER PUBLICATIONS

M.J. Dvorchak, et al., "Aldimine–Isocyanate Chemistry: Application in High Solids Coatings," Waterborne, Higher–Solids, and Powder Coatings Symposium, Feb. 22–24, 1995, pp. 78–87.

S.M. Lee, et al., "Aldimine–Isocyanate Chemistry: A Foundation for High Solids Coatings," Waterborne, Higher–Solids, and Powder Coatings Symposiumn, Feb. 22–24, 1995, pp. 69–77.

Wicks, et al., "Amine Chemistries for Isocyanate–Based Coatings," Progress in Organic Coatings, (1997), vol. 30, pp. 265–270.

*Primary Examiner*—Patrick D. Niland
*Attorney, Agent, or Firm*—Jansson, Shupe, Bridge & Munger, Ltd.

[57] ABSTRACT

This invention relates to a new and useful color pigmented moisture curing polyurethane coating that has an adjustable drying time, as well as methods of producing the coating. The coating is suitable for use as a protective and/or decorative coating. The coating comprises one or more specified color pigments, polyisocyanates, polyols, tertiary amines, and blocked amines. The blocked amines, in conjunction with the tertiary amines, allow the coating to dry slowly once the coating has been applied, resulting in a defect free surface. Furthermore, an additional catalyst, comprising a metal catalyst may optionally be added to the coating immediately prior to use in order to speed up the rate of drying of the coating, allowing for very precise control of the drying speed of the coating. Additional optional ingredients may be added to the coating composition, including ultraviolet light stabilizers, wetting agents, solvents, and agents to increase slip and flow.

44 Claims, 2 Drawing Sheets

COLOR PIGMENTED MOISTURE CURING POLYURETHANE COATING HAVING AN ADJUSTABLE CURE TIME AND METHOD FOR PREPARING SAME

FIELD OF THE INVENTION

This invention relates to polyurethane coatings, and more specifically, to a color pigmented, moisture curing polyurethane coating having a cure time that may be adjusted by the end user of the coating for customized applications, and may be used to produce a high gloss finish.

BACKGROUND OF INVENTION

There are many commercial and industrial protective and/or decorative coatings for use on walls, machines, and other such objects requiring protective coatings. Polyurethane coatings are known in the industry as one of the toughest coatings available. There are many polyisocyanates that react with atmospheric water at room temperatures and form useful films that are used in a limited form as moisture curing polyurethane coatings. This type of coating is one of the finest coatings available that can be produced without the use of heat or other external sources of energy being applied. They are very useful for objects that cannot be heated such as prefabricated metal building, plastics, large machinery, airplanes, ships, etc. However, due to certain problems, there is a reluctance to use such coatings.

One such problem is that the color pigments contain adsorbed moisture on their surfaces that cause the polyurethane formula to gel within a few days, becoming hard and unfit for commercial use. To overcome the problems of combining color pigments and isocyanate polymers to create a moisture curing polyurethane, the industry, for the most part, has resorted to a two package system. In preparing a polyurethane coating using the two package method, a polyol is chosen that will chemically combine with a suitable polyisocyanate. The polyol portion is pigmented to achieve the desired color, opacity, etc. The pigmented polyol portion and the polyisocyanate are supplied in separate containers to the ultimate user or consumer. The consumer mixes the two portions in accordance with the ratio specified by the manufacturer just prior to use. This admixture has a limited life and must be used up within a relatively short period of time or it will harden and become unusable.

This approach is not only cumbersome but expensive in that it results in a quantity of hardened and wasted material if the entire admixture is not used up. There is also a risk in that the pigmented polyol portion and the polyisocyanate portion will not be mixed in the correct ratio causing serious damage to the performance of the resulting polyurethane coating. In addition, atmospheric moisture is a significant factor in using the two package method in that water also cures isocyanates. On a hot, humid day, a large portion of the polyisocyanate can be cured by atmospheric moisture, leaving a portion of the polyol with nothing to cross link itself with, and resulting in a coating less desirable than if the polyol was completely cross linked. Likewise, on a cold, dry day more of the polyol will cross link with the polyisocyanates. It is apparent that the two package polyurethane coating method will produce a quality of coating dependent upon atmospheric conditions, said conditions being almost always impossible to control, and if so, very expensive.

Also, these conventional two component polyurethane coating systems suffer from an inability to produce a satisfactory high gloss finish, as compared to a matte finish, due to the release of carbon dioxide in the coating film which forms blemishes and microblisters upon drying, due to a side reaction of the polyisocyanate within the film coating, which reacts with atmospheric moisture. These blemishes and microblisters mar the high gloss finish and result in an unacceptable high gloss film being produced. Even where a matte finish is desired, these blemishes can be conspicuous enough to make the finish cosmetically unacceptable.

Moisture curing polyurethane coatings can be made in a single package method eliminating some of the above mentioned problems of the two package types. One such moisture curing polyurethane coating is taught by Urs, U.S. Pat. No. 4,304,706, which is hereby incorporated by reference. MPEP § 608.01(p). This moisture curing coating comprises a color pigment dispersion, an isocyanate prepolymer, an organometallic catalyst and, typically, a solvent to produce a useful coating. However, this technology has been unsuccessful in producing a high gloss coating finish, rather than a matte coating finish. During the moisture curing process, which entails the reaction of the isocyanate with atmospheric moisture, carbon dioxide is generated within the coating. The carbon dioxide escapes from the coating, leaving unsightly and cosmetically unacceptable microblisters in the coating.

One method to control the escape of carbon dioxide from the polyurethane coating is to combine the moisture curing polyurethane compound with a class of "blocked" primary and secondary amines, such as aldimines or ketimines, just prior to the application of the coating during use. The use of these blocked amines in conjunction with moisture curing polyurethanes is well known to those of ordinary skill in the art. However, when moisture curing polyurethane coatings known in the art are combined with such blocked amines, the resulting coating has a very short "pot" life, i.e., once the blocked amine is added to the coating composition, the coating must be used within a few hours, as the viscosity of the coating increases such that application of the coating will become impractical. It is impossible to coat large objects, such as airplanes or motor vehicles, with such compositions as overspray mist of the coating falls onto parts which have already been coated and have dried, thus marring the cosmetic appearance of the overall coating with overmisting which falls onto a surface where the coating has already dried. Moreover, the cure time of the polyurethane coating prepared according to this technology is determined by its components and cannot be adjusted or customized by the end user of the coating.

There remains a need for a pigmented moisture curing polyurethane coating which may be easily, efficiently and inexpensively produced on a commercial basis which will dry slowly when compared to previously known compositions, will prevent the formation of microblisters within the dried coating, and will be free of overspraying blemishes, while having an improved pot life. There also remains a need for a pigmented moisture curing polyurethane coating which can be easily used to create an unblemished, high gloss finish. Additionally, there is a need for a pigmented moisture curing polyurethane coating having a drying time that can be customized by the end user for each individual application.

SUMMARY OF INVENTION

An object of the present invention is to provide a new and useful color pigmented moisture curing polyurethane coating that has an adjustable drying time.

Another object of the present invention is to provide a method for efficiently and inexpensively manufacturing such coatings.

A further object of the present invention is to provide a color pigmented moisture curing polyurethane coating that has a slow drying time such that overspray mist will blend into the coating and so that unsightly microblisters can be prevented from forming during use of the coating to form a film on a desired object, such that a high quality gloss or matte finish may be created.

An additional object of the present invention is to provide a color pigmented moisture curing polyurethane coating having a pot life of more than 24 hours, such that coating that has been mixed in the field for final use may be used over a period of multiple work shifts, decreasing cost and waste.

Still another object of the invention is to provide a color pigmented moisture cured polyurethane coating that has reduced levels of atmospheric emissions of volatile organic compounds compared to conventional two component and single component moisture curing polyurethane coatings.

More specifically, it is an object of the present invention to provide a color pigmented moisture cured polyurethane coating that may be applied to produce a high gloss or matte finish, free of microblisters and other surface defects, comprising a pigment dispersion which consists of one or more pigments and a first prepolymer reaction product formed in the presence of a tertiary amine catalyst, a second isocyanate prepolymer, and a blocked amine to allow the moisture curing polyurethane coating to dry slowly once the coating has been applied, thus accepting overspray misting and preventing surface defects in the resulting film. The first prepolymer reaction product is the reaction product of a polyisocyanate and a polyol which reacts in the presence of a tertiary amine catalyst, and exhibits excess hydroxyl groups. The second isocyanate prepolymer has an excess of isocyanate groups capable of reacting with and consuming all of said hydroxyl groups on the first prepolymer, in the presence of a tertiary amine, and providing an excess of unreacted isocyanate groups to produce the polyurethane. The blocked amine is added to the combined pigment dispersion and second isocyanate prepolymer just prior to its use to prevent escaping carbon dioxide gas from marring the resulting film once the moisture curing polyurethane has been applied, to produce a defect-free finish. The color pigmented moisture cured polyurethane coating may include one or more optional ingredients including one or more solvents, ultraviolet light stabilizers, wetting agents, and agents to increase slip and flow.

Moreover, another object of the present invention is to optimize the curing time for the color pigmented moisture cured polyurethane coating by adding one or more optional organometallic metal catalysts immediately prior to use of the coating to produce a film on a selected object, in order to selectively shorten the curing time of the film.

It is also an object of this invention to provide a commercial method for efficiently and inexpensively manufacturing a color pigmented moisture curing polyurethane coating having an adjustable curing time.

Another object of the invention is to manufacture a color pigmented moisture curing polyurethane coating having an adjustable curing time by using conventional high yield paint manufacturing equipment.

DETAILED DESCRIPTION OF THE INVENTION

Figure 1:
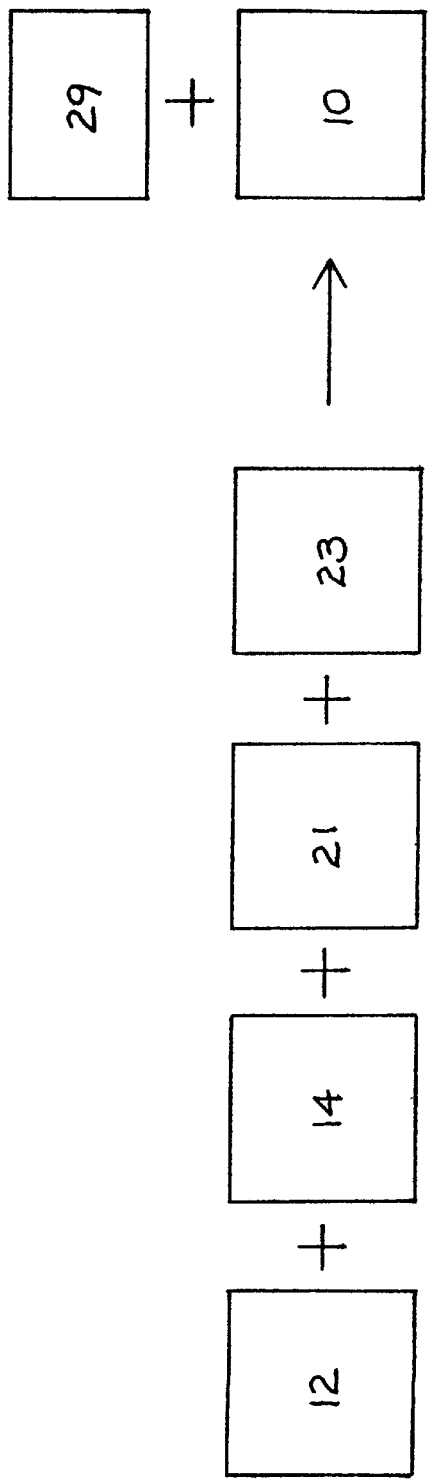
FIG. 1 illustrates, by means of a block diagram, a method for manufacturing a color pigmented moisture curing polyurethane coating with an adjustable curing time in accordance with the present invention.

The present invention of a color pigmented moisture curing polyurethane coating having an adjustable curing time comprises a pigment dispersion which consists of a pigment and a first prepolymer reaction product, a second isocyanate prepolymer, and a blocked amine. A tertiary amine catalyst is utilized to produce the pigment dispersion, rather than conventional organometallic catalysts. The tertiary amine acts as a catalyst to drive the initial dehydration reaction involving the polyisocyanate, pigment and other optional ingredients of the first prepolymer reaction product. The tertiary amine further acts as a catalyst during the extension reaction between the polyisocyanate of the first prepolymer reaction product and the polyol. Moreover, the tertiary amine acts as only a mild catalyst for the blocked amine and polyisocyanate reaction which produces the final product, i.e, a slow drying moisture curing polyurethane. The addition of the blocked amine to a polyurethane coating containing a tertiary amine as the catalyst allows the coating to dry slowly when applied, thus accepting overspray misting and preventing surface defects in the resulting film. It has been surprisingly and unexpectedly discovered that the addition of a tertiary amine as a catalyst for a moisture curing polyurethane, rather than typical organometallic catalysts used in the art, allows a longer curing time in the presence of a blocked amine, resulting in a slow drying film being formed upon application. Such film is particularly useful for forming a high gloss finish on an object to which the coating is applied, especially for large objects such as machinery, vehicles, airplanes and the like.

In the preferred embodiment, the invention comprises about 10–90 percent by weight the pigment dispersion, about 10–90 percent by weight the second isocyanate prepolymer, and about 5–110 percent stoichiometric amount of blocked amine. Preferably, the blocked amine is added just prior to use of the polyurethane coating composition.

The pigment dispersion comprises a pigment and a first prepolymer reaction product, the prepolymer reaction product comprising the reaction product of a polyisocyanate and a polyol in the presence of the tertiary amine catalyst, the first prepolymer reaction product exhibiting excess hydroxyl groups. The pigment dispersion is initially reacted in the presence of the tertiary amine catalyst prior to the addition of the polyol, to drive the dehydration reaction. In a preferred embodiment, the pigment dispersion comprises about 2–70 percent by weight of the pigment about 10–90 percent by weight of the first prepolymer reaction product, and about 0.05–2.0 percent by weight the tertiary amine.

The pigments may consist of one or more colored pigments well known to those of ordinary skill in the art. Such pigments are generally metal oxides. Preferred pigments include, but are not limited to, titanium dioxide, iron oxides, organic complexes, mica, talc and quartz. One pigment may be used, or a combination of two or more pigments may be utilized. Different colors can be obtained by choosing proper pigments and combining them in a similar fashion as set forth in the following examples with the necessary adjustments, common in the paint industry, being made.

The first prepolymer reaction product comprises the reaction product of a polyisocyanate and a polyol in the presence of the tertiary amine catalyst. The preferred polyisocyanates are aliphatic diisocyanates, and require the presence of the tertiary amine catalyst to speed up the dehydration reaction and the extension reaction which occurs upon addition of the polyol. In a preferred embodiment, the first prepolymer reaction product comprises 1–40 percent of the polyisocyanate by weight and 2–98 percent of the polyol by weight. No metal catalyst should be present at the stage of production where the first prepolymer reaction product is formed. Following addition of the second isocyanate prepolymer, a suitable blocked amine is added. The blocked amine is preferably added immediately prior to final use of the coating. In a preferred embodiment, 5–110 percent stoichiometric amount of blocked amine is added. The blocked amine reacts with the polyisocyanate in the presence of water to produce the final film. The tertiary amine also acts as a catalyst for this reaction. However, the tertiary amine is a much more mild catalyst than metallic catalysts typically used in the art to produce polyurethane coatings, and thus allows a slower curing time such that a defect free film that accepts overspray mist may be produced, without microblisters being present in the final dried film. If a faster drying time is desired, one or more optional additional metal catalysts may be added together with the blocked amine to decrease the drying time, thus allowing the drying time of the final film to be closely adjusted as needed. However, no metal catalyst should be present until just immediately prior to use to ensure that the coating remains slow drying and does not have a short pot life. Moreover, only the amount of coating needed for quicker drying should be treated with the metal catalyst, preserving the balance of longer curing coating for other or later uses. This highlights another advantage of the present invention—one or more batches of the coating can be treated with the metal catalyst to accelerate curing time to one or more different curing times, while the original material (with the longer curing time) can be used for projects requiring such long cure times or saved for future use, as needed.

Preferred organic diisocyanates include, but are not limited to: isophorone diisocyanate (IPDI); trimethyl hexamethylene diisocyanate (TMDI) which is excellent for flexible coatings and for exterior use; toluene diisocyanate is low priced but exhibits poor exterior characteristics; and, diphenyl methane diisocyanate (MDI) which has poor exterior durability but forms a tough chemical resistant coating.

Polyols are well known in the art and are readily available in the market place. Useful polyols include, but are not limited to: TONE-0210 (Union Carbide Corporation, Lisle, Ill.), a polycaprolactone; polymeg polyols, polytetramethylene ether glycols; polypropylene glycols, low priced polyethers; Desmophen 1700 (Bayer Corporation, Pittsburgh, Pa.), a polyester diol; 1,4-butanediol, a short chain alkylene diol such as used in conjunction with other long chain diols to produce tough and abrasion resistant coatings; 1,4cyclohexane dimethanol (Eastman Chemicals, Kingsport, Tenn.); and polyamines such as ethylenediamine.

The second isocyanate prepolymer may comprise polyisocyanates (which are basic raw materials in the manufacture of moisture curing polyurethanes) having very low monomer contents which can only be produced by using very sophisticated technology and equipment. Preferred polyisocyanates include, but are not limited to, Desmodur N-75 (Bayer Corporation, Pittsburgh, Pa.) (generically biuret of hexamethylene diisocyanate); Mondur CB-75 (Bayer Corporation, Pittsburgh, Pa.); Mondur T-1890; Talonate HDT-LV (Rhone-Poulenc, Cranbury, N.J.) and Luxate HD-100 (Arco Chemicals, Newtown Square, Pa.). There are several other polyisocyanates commercially available that come under similar classification. It is desirable to manufacture pigmented moisture curing polyurethanes using these preferred polyisocyanates for the following reasons: (1) they offer the lowest possible monomer contents; and (2) they are of the lowest possible viscosities and hence require less solvent reducing the cost in the final product.

Numerous tertiary amines may be utilized in the present invention. A single tertiary amine may be used, or a combination of two or more may be added as catalysts. Preferred tertiary amines include, but are not limited to: Desmorapid PP (Bayer Corp, Pittsburgh, Pa.); triethyl amine (Aldrich, Milwaukee, Wis.); N,N,N',N',N"-pentamethyldiethylenetriamine (Aldrich, Milwaukee, Wis.); and N,N,N', N'-tetramethyl-1,3-propanediamine (Aldrich, Milwaukee, Wis.).

Numerous blocked amines well known in the art may be used in the present invention. Blocked amines are herein defined as those amines that will produce primary and secondary amines when exposed to water or water vapor, with or without the release of the respective aldehyde or ketone. Preferred blocked amines include aldimines, ketimines and oxazolidines. Aldimines are commercially produced by the condensation of aldehydes with primary diamines, followed by removal of the water by-product. Ketimines are produced in a similar fashion, with ketones being utilized in place of the aldehydes. Oxazolidines are produced by condensing either ketones or aldehydes with alkanolamines, with the water by-product again being removed. The preferred blocked amine is Vestamin 139 (Huls America, Inc., Piscataway, N.J.).

By utilizing a blocked amine with a polyol/polyisocyanate composition that has been reacted in the presence of a tertiary amine catalyst, rather than metal catalysts, it has been surprisingly and unexpectedly discovered that a moisture curing polyurethane coating results which may be applied to produce a high gloss finish on an object that dries slowly enough to allow for overspray blending and is free of imperfections formed by carbon dioxide gas bubbles escaping from the curing coating. These blocked amines react with the polyisocyanates in the presence of tertiary amines according to the present invention in the presence of atmospheric moisture to produce a useful, defect-free polyurethane film. The long curing time of this defect free polyurethane film may be adjusted by the addition of the optional metal catalysts.

Other optional ingredients may also be included in a color pigmented moisture curing polyurethane coating having an adjustable curing time of the present invention. One or more solvents may be included, if necessary, to assist in process and solubility. The solvent, if present, will preferably be present in an amount of about 0–60% percent by weight of the total coating. The lowest possible quantities of solvents required for forming the coating should be utilized for reasons of economy and environment protection. Suitable solvents include, but are not limited to: ketones such as methyl isobutyl ketone and methyl amyl ketone; butyl acetate; and xylene.

It is important that the color pigmented moisture curing polyurethane coating having an adjustable cure time of the present invention be kept free of acids or acid generators. A low acidity will shorten the curing/drying time of a film of the coating when applied. Therefore, it is critical that the hydrogen donor, i.e. polyols, of the invention have as low an acid number as possible.

Other optional ingredients include metal catalysts. Such metal catalysts may be added just prior to use of the coating composition to form a film, i.e. "paint", on an object. Preferably, no metal catalyst is included during manufacture of the coating to allow for maximum latitude in application in the field. Ingredients that have been processed themselves with organometallic compounds, such as polymeric hydrogen donors, including polyols, which may contain residual traces of the organometallic compounds, should be avoided during processing of the coating composition. The presence of any residual amounts of these organometallic compounds can adversely affect maximization of the final coating cure time.

However, when desired, the addition of such metal catalysts shortens the curing time, and allows the user to closely customize the cure time of the coating composition for specific applications. In a preferred embodiment, the metal catalyst is added in an amount of about 0.05–2.0% by total weight of the coating composition, with the most preferred amount of the metal catalyst being about 0.01–0.5% by total weight of the coating composition. The following table shows examples of the effect of a metal catalyst on the coating of Example 1, below, when tested at 77° F. and 30% relative humidity:

|  | Example 1 Curing Time | Example 1 plus 0.2% dibutyl tin dilaurate accelerator |
| --- | --- | --- |
| Cotton free (ASTM D-1640) | 4 hours | 30 minutes |
| Tape resistance (MIL-PRF-85285C) | 8 hours | 1 hour |
| Water spot resistance (ASTM D-1308) | 8 hours | 1 hour |

The concentration of the metal catalyst varies according to the needs of the particular application for the coating. However, any concentration of metal catalyst may be used if the resulting limitation in the curing characteristics of the coating are acceptable. By adjusting the amount of metal catalyst present, it has been surprising and unexpectedly discovered that a polyurethane coating composition can be prepared which, by allowing the metal catalyst to be added following preparation of the polyurethane and immediately prior to its use, will have an adjustable cure time.

The metal catalyst is generally, though not necessarily, an organometallic compound. Preferred metal catalysts include, but are not limited to: dibutyl tin dilaurate (Air Products & Chemicals, Allentown, Pa.); dibutyl tin diacetate (Air Products, Allentown, Pa.); stannous octoate (Air Products, Allentown, Pa.); zinc naphthanate (Huls America, Inc., Piscataway, N.J.); and iron (III) acetylacetonate (Aldrich, Milwaukee, Wis.).

Other additives well known in the paint processing art may also be included as desired. These additives include, but are not limited to: ultraviolet light stabilizers, wetting agents, and agents to increase slip and flow.

The preferred embodiment illustrated in FIGS. 1 through 4 and as described herein is not intended to be exhaustive or to limit the invention to the precise form disclosed. It is chosen and described in order to best explain the principles of the invention and its application and practical use to thereby enable others skilled in the art to best utilize the invention.

The process illustrated in the drawings and described hereinafter for making a color pigmented moisture curing polyurethane coating with an adjustable cure time 10 is comprised of a color pigment dispersion 12, an isocyanate prepolymer 14, and a blocked amine 21.

Figure 2:
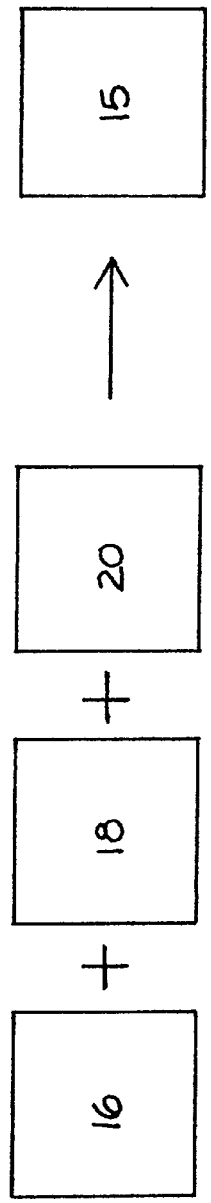
FIG. 2 illustrates, by means of a block diagram, the method for yielding a slurry as embodied by the present invention.

The color pigment dispersion 12 comprises in part a slurry 15. The slurry 15 is comprised of color pigments 16, solvents 18, and additives 20 which are combined in jacketed tanks well known in the art and commonly used in the making of paints and other types of protective coatings, as illustrated in FIG. 2. The additives 20 are well known in the art of paint manufacturing and are added to the color pigments 16, and solvents 18, forming the slurry 15. Although the additives are well known in the art special attention must be paid to their compatibility and/or reactivity with the isocyanate prepolymer 14 for reasons that will be discussed hereinafter. The color pigments 16 and solvents 18 used in the slurry 15 are well known in the art and are readily available in the market.

The slurry 15 is agitated to form a homogenous mixture after which a small sample is withdrawn to test its moisture content by means of the Karl-Fischer titration test, well known in the art, or by other methods well known in the art. The moisture or water is contained in the admixture of the pigments, solvents and additives. The amount of water present in the slurry 15 is calculated from the results of the test sample.

A quantity of monomeric diisocyanate 22 well known for its moisture eliminating qualities is calculated to completely consume the water present in the slurry 15 and added to the slurry 15 together with a tertiary amine catalyst 19. The tertiary amine catalyst 19 helps to drive the dehydration reaction between the slurry 15 and the diisocyanate 22. An additional amount of monomeric diisocyanate 22 is added to the slurry 15. The additional amount depends on the nature of a polyol or hydrogen donor 24 that will be added later in the process. This will be discussed hereinafter.

The slurry 15, tertiary amine 19 and the monomeric diisocyanate 22 are continuously agitated at between about 150° F. and 160° F. until the water-isocyanate reaction is complete or has reached the desired level; that is, elimination of the water, i.e, dehydration, in the slurry 15 is complete. When the isocyanate-water reaction is complete, an amine titration test, well known in the art, may be used to confirm the amount of monomeric diisocyanate 22 present in the admixture of the slurry 15 and organic monomeric diisocyanate 22.

Figure 3:
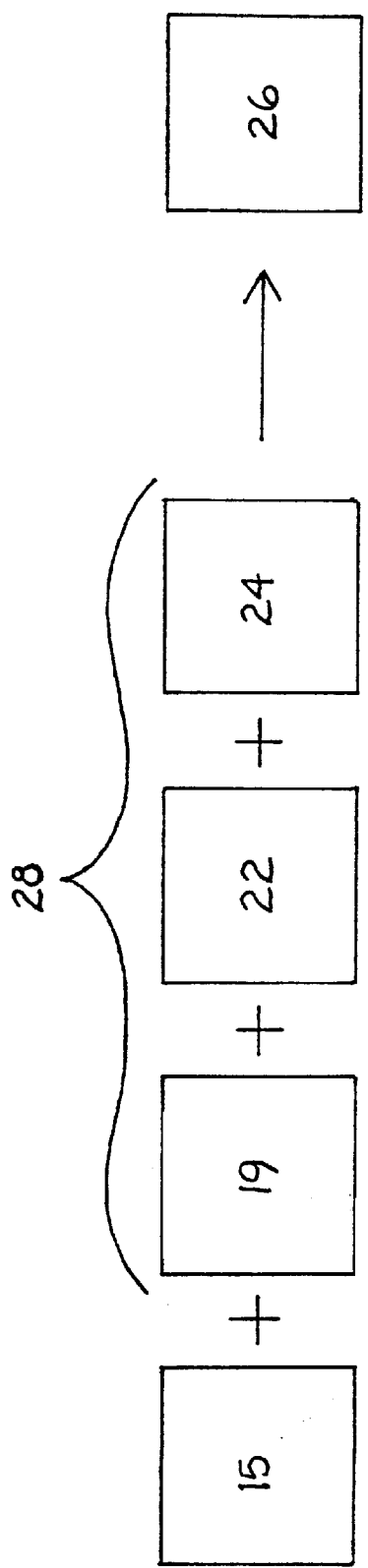
FIG. 3 illustrates, by means of a block diagram, the method for yielding a pigment dispersion paste as embodied by the present invention.
Figure 4:
FIG. 4 illustrates, by means of a block diagram, a method for yielding a color pigment dispersion as embodied by the present invention.

The polyol, or other suitable hydrogen donor 24 is added, to the admixture of the slurry 15, tertiary amine 19 and monomeric diisocyanate 22 forming a color pigment dispersion paste 26, said admixture being agitated until the excess monomeric diisocyanate 22 is consumed by the hydrogen donor 24, as shown in FIG. 3. The tertiary amine 19 catalyzes the extension reaction between the monomeric diisocyanate 22 and the hydrogen donor 24. The tertiary amine 19 is a sufficient catalyst for these reactions, and no metal catalyst is needed, nor should one be present at this stage.

The complete consumption of diisocyanates by the hydrogen donor 24 can be confirmed with either an amine titration test or a centrifuged sample scanned on an infrared spectrophotometer well known in the art or by other means well known in the art. A first prepolymer reaction product 28 is formed by the combination of the organic monomeric diisocyanate 22 and the organic polyol 24 in the presence of the tertiary amine catalyst 19 ; said first prepolymer reaction product exhibiting an excess of hydroxyl groups.

At this stage the paste 26 can be dispersed in any of the customary dispersion equipment well known in the art, resulting in the color pigmented dispersion 12. Caution must be exercised to prevent contamination of the dispersion by atmospheric and other sources of moisture from this stage on.

Twelve and one third (12.33) parts by weight of the monomeric isocyanate IPDI, will consume one (1) part by weight of water of the slurry 15. Therefore, based on the amount of water found by means of the Karl-Fischer titration test, the amount of IPDI 22 needed to dehydrate the water in the slurry 15 can be calculated. Note that if any other additives are used that bring with them other materials that react with isocyanates, additional IPDI will have to be used for complete dehydration of the slurry 15.

The reaction product 28 of the monomeric diisocyanate 22 and the organic polyol 24, in the presence of the tertiary amine catalyst 19, is a long chain polyol. This reaction product 28 will produce a moisture curing polyurethane coating with a cure time sufficient to allow for unblemished high gloss finishes to be produced when combined and further reacted with the second prepolymer 14 and the blocked amine 21. The dispersion 12 is then mixed with the second isocyanate prepolymer 14, and a blocked amine 21 is added at a later stage immediately prior to use, together with any optional ingredients, to produce the moisture curing polyurethane coating with an adjustable cure time 10. The curing time of the polyurethane coating 10 may be adjusted as desired by the addition of an optional metal catalyst 29. By varying the amount of the metal catalyst 29 added to the polyurethane coating 10, the curing time may be tightly controlled.

Note that a solvent may be utilized to enable a homogeneous mixture of the dispersion 12 with the second prepolymer 14. Any suitable solvent can be used.

The type and amount of the polyol 24 chosen is dictated by the following factors: (1) the nature of the polyisocyanate 14 that the dispersion 12 will be later mixed with to form the pigmented moisture curing polyurethane paint; (2) the properties that are desired in the final pigmented moisture curing polyurethane coating 10; the properties such as flexibility, hardness, chemical resistance, etc. of any moisture curing polyurethane are greatly influenced by the functionality and equivalent weight of the polyisocyanate prepolymer 14 used in making the coating. That is to say that soft and flexible coatings and hard and tough coatings as required for a particular end use can be made by controlling the functionality and equivalent weight of the polyisocyanate in its ready to use form.

Functionality is defined as difunctional polyisocyanates (two isocyanate groups per molecule) that generally produce (all else being equal) soft, flexible and rubbery coatings. Polyisocyanates having a functionality of more than two (more than two isocyanate groups per molecule) produce harder and tougher films.

Equivalent weight is defined as the equivalent weight of the polyisocyanate influences the properties of the final coating. Polyisocyanates having a high equivalent weight produce a less brittle coating than a low equivalent polyisocyanate.

It is considered preferable to have an equivalent weight of 500 to 3000 for the first prepolymer reaction product 28 when using the second prepolymer 14. However, the end use properties such as flexibility, durability, chemical resistance, abrasion resistance, etc. dictates the preferable equivalent weight of the polyurethane coating 10.

The functionality and equivalent weight of any moisture curing polyurethane coating 10 can be controlled by properly choosing either the polyol 24 or the polyisocyanate 14. In other words, a low equivalent weight polyisocyanate 14 can be converted to a high equivalent weight moisture curing polyurethane by partially reacting it with a high equivalent weight difunctional polyol 24, thus achieving increased flexibility. Also, if a difunctional polyisocyanate 14 is used it can be converted into a trifunctional moisture curing polyurethane coating by choosing a trifunctional polyol 24 as its co-reactant, thus achieving increased toughness in the final coating.

The blocked amine 21 is added to the mixture of the color pigment dispersion 12 and the isocyanate prepolymer 14 immediately prior to application of the composition, resulting in polyurethane coating 10. The tertiary amine catalyst 19 acts as a mild catalyst between the polyisocyanate and blocked amine 21, allowing for a slow curing time of the polyurethane coating 10, producing a defect free film. This curing time is decreased by the addition of the optional metal catalyst 29, which may be added together with the blocked amine 21.

The choice of the polyol 24, monomeric diisocyanate 22, the polymeric isocyanate 14, the tertiary amine 19, and the blocked amine 21 illustrated in the following examples are one of many combinations that can be used. If a difunctional polyisocyanate 14 is the chosen resin, then slightly branched polyols can be used.

It is highly desirable to have the following qualities in moisture curing polyurethane coatings having an adjustable cure time: (1) pigmentation for aesthetics, control of gloss, durability, viscosity and corrosion; (2) lowest possible monomer content to reduce toxicity; (3) lowest possible quantities of solvents for reasons of economy and environmental protection; (4) formulating latitude so that a variety of products can be made with the ease of relatively few raw materials; (5) ease of color matching to reduce production costs; (6) a long curing time to avoid microblisters and to permit overspray to blend in to an applied film; (7) minimization of use of any metals in the production of the coating to maximize the cure time of the coating delivered to a user; and (8) allowing the curing time to be adjustable by the end user, such that each commercially produced batch of the coating may have multiple curing times.

These desirable advantages are achieved as follows. The undesirable moisture in the slurry 15 is eliminated by using a calculated excess of the monomeric diisocyanate 22. The toxic and undesirable, but calculated excess of the monomeric diisocyanate, is used to advantage to extend a calculated excess of a low equivalent weight polyol 24 into a long chain polyol with a tough urethane backbone with a higher equivalent weight. The diisocyanate and the polyol reacting to form the first prepolymer having an excess of hydroxyl groups.

The dispersion paste 26 offers several of the following benefits: (a) the reaction product 28 acts as a grinding vehicle for the dispersion of the pigments; (b) since the pigments have been dehydrated, they are easy to disperse; (c) the completed dispersion can be made in many basic colors and stored without adding the polyisocyanates 14. These various colors can be intermixed at a later date to achieve any desired shade of color. When the desired color has been reached, the required quantity of the chosen polyisocyanate and solvents (if any) can be mixed into a complete batch. This greatly simplifies the manufacture of different shades of paint; (d) since the long chain polyol reaction product 28 will react faster with monomeric isocyanates than with polyisocyanates, the small quantity of monomeric isocyanates that is in the polyisocyanate will be partially consumed by the long chain polyol. Thus the monomer content of the polyisocyanate 14 is further reduced.

The isocyanate prepolymers such as Mondur CB-75 by themselves are totally unsuitable to use as moisture curing polyurethanes as they form very brittle films. The long chain polyol prepared according to the present invention acts as a "bridge" between molecules of the second isocyanate prepolymer 14. The second prepolymer comprises an excess of isocyanate groups that react with and consume all the hydroxyl groups of the first prepolymer.

As previously mentioned formulating latitude is important so that the formulation can use a minimum number of raw materials to obtain a broad range of moisture curing polyurethanes with adjustable cure times. The present invention incorporates the ability to change the quantity of excess monomeric diisocyanate 22 used followed by a corresponding change in the quantity, equivalent weight and functionality of polyol 24 used, allowing the quantity of tertiary amine 23 to be varied. The result is that the number and length of "bridges" between the molecules of polyisocyanate 14 are controllable making the composition 10 more or less flexible depending on the nature of change made in the quantity of the excess monomeric diisocyanate 22 used and the corresponding changes in the polyol 24, and the presence of the catalysts, both the tertiary amine 23 and metal catalyst allowing for tight control over the curing time.

The color pigmented dispersion 12 together with the tertiary amine catalyst 23 may be packaged themselves and later combined with the isocyanate prepolymer 14 prior to use or it may be mixed together and sold ready for use without additional mixing. The present process, that enables this to be done, as set forth hereinabove, provides for the removal of water from the slurry 15 by means of the monomeric diisocyanate 22; an excess of which is used to ensure complete dehydration of the water formed in the slurry 15. The excess diisocyanate 22 combines with the polyol or hydrogen donor 24 resulting in long chain polyol 28 which, when combined with the prepolymer 14, flexiblizes it. The flexiblizing of the prepolymer 14 by means of the color dispersion 12 enables a color pigmented moisture curing polyurethane coating having the desirable properties set forth above to be produced.

A long curing time to avoid microblisters and to permit overspray mist blending on an applied film, thus marring the surface of the film, is produced by the addition of one or more blocked amines. The blocked amines are added to the pigment dispersion/second isocyanate prepolymer, reacting with the polyisocyanate in the presence of the tertiary amine catalyst to form the final film of the polyurethane coating.

The cure time is adjustable by the end user, such that each commercially produced batch of the coating may have multiple curing times. A small amount of optional metal catalyst may be added to the coating composition immediately prior to use will allow the cure time to be carefully customized for each application.

The invention is further described in the following, non-limiting examples.

EXAMPLE 1

Production of a Color Pigmented Moisture Curing Polyurethane Coating Having an Adjustable Cure Time In a container equipped with a high speed dissolver and heating jacket the following were placed under agitation (all percents are percents by total weight of the finished polyurethane coating): 4.50% methyl amyl ketone (solvent) (Eastman Chemicals, Kingsport, Tenn.); 1.26% Disperbyk 163 (wetting agent) (Byk Chemie USA, Wallingford, Conn.); 0.75% Sanduvor 3056 (UV stabilizer) (Caariant Corp., Coventry, R.I.); 0.75% Byk 361 (flow and leveling agent) (Byk Chemie USA, Wallingford, Conn.); 0.54% Aerosil R-972 (anti-pigment settling agent) (Degussa Inc., Teterboro, N.J.); Tipure R-706 (white $TiO_2$ pigment) (Dupont Chemical, Wilmington, Del.) to form a slurry. The slurry was mixed at high speed to develop heat to about 150–160° F.

Then a small sample was drawn and tested for water concentration using the Karl Fischer method. Based on the results, 1.67% isophorone diisocyanate (IPDI) (Huls America, Inc., Piscataway, N.J.) was added to completely react with and eliminate all the water formed in the slurry was added. At the same time, an additional 1.87% of IPDI, calculated to also produce useful urethane polyol, was added. Following the addition of IPDI, 0.34% of the tertiary amine catalyst Desmorapid PP™ (Bayer Corp., Pittsburgh, Pa.) was added to accelerate the dehydration process. The agitation was continued for 90 minutes and a fresh sample was tested as before for water content. The concentration of water was found to be less than 0.01 %. At this stage, the temperature of the slurry was found to be between 170° F. and 180° F.

Satisfactory dehydration having been achieved, 7.89% Tone 0201 polyol™ (Union Carbide Corp., Lisle, Ill.), a polycaprolactone and an additional 6.02% methyl amyl ketone solvent were added to the slurry and the agitation continued.

After approximately two hours, a small sample was withdrawn and centrifuged to separate the resin (Tone 0201/IPDI extended urethane polyol) from the pigments. The supernatant layer was analyzed for the presence of isocyanate in an infrared spectrophotometer (Perkin-Elmer, Model 1430, Norwalk, Conn.). A characteristic small band was detected at approximately the 2775 $cm^{-1}$ wavelength indicating the presence of un-reacted IPDI in the slurry. The mixing of the slurry was continued for an additional hour and the slurry was re-checked for the presence of IPDI. There was none. This is the completion of the extension process. The extended paste was run through a sand mill to eliminate all pigment agglomerates. This is a common practice in the coating industry. The sand milled paste was then combined with a mixture of 13.18% polyisocyanate polymer Talonate HDT-LV™ (Rhone Poulenc, Cranbury, N.J.) and 13.18% polyisocyanate polymer Luxate HD-100 (Arco Chemicals, Newtown Square, Pa.) and agitated under nitrogen blanket for 30 minutes. Another 8.61% methyl amyl ketone and 0.17% Byk 310™ were added, homogenized and the paint was packaged.

EXAMPLE 2

Production of a Color Pigmented Moisture Curing Polyurethane Coating Having an Reduced Cure Time A polyurethane coating was produced in accordance with Example 1, except that 0.05% by total weight of an additional component, an organometallic catalyst, dibutyl tin dilaurate, was added after the coating was completed and mixed, resulting in a coating having a reduced cure time.

EXAMPLE 3

Production of a Color Pigmented Moisture Curing Polyurethane Coating Having an Reduced Cure Time A polyurethane coating was produced in accordance with Example 1, with the IPDI being replaced with 2.39% paratoluenesulfonyl isocyanate, and Tone 0230 polyol (Union Carbide Corp, Lisle, Ill.) replacing the Tone 0201 polyol. The amount of Tone 0230 polyol used to replace the Tone 0201 polyol may be determined by one of ordinary skill in the art.

EXAMPLE 4

Comparison Cure Time Tests of Color Pigmented Moisture Curing Polyurethane Coatings Samples of the coatings produced in Examples 1, 2 and 3 were combined with Vestamin 139 (an aldimine) (Huls America, Inc., Piscataway, N.J.) in 95% stoichiometric amounts and the admixtures were drawn down a Morest card using 3 mil Byrd applicators. These draw downs were allowed to dry under ambient laboratory conditions and periodically checked for their drying status by ASTM D1640 using the cotton fiber method.

The results showed that at the end of 20 minutes, the draw down from Example 3 were completely cotton fiber free. The draw down made from Example 2 became cotton fiber free only after 3 hours while the draw down made from Example 1 was cotton fiber free only after 6 hours.

EXAMPLE 5

Comparison Cure Time Tests of Color Pigmented Moisture Curing Polyurethane Coatings Three coating composition samples were prepared as follows. The first sample comprised the base coating of Example 1, with 12% Vestamin 139 added. The second sample comprised the base coating of Example 1, with 12% Vestamin 139 and 0.025% dibutyl tin dilaurate added. The third sample comprised the base coating of Example 1, with 12% Vestamin 139 and 0.625% dibutyl tin dilaurate added.

The ASTM D1640 cotton fiber test, as described in Example 5, was conducted on each of the samples under ambient laboratory conditions. The first sample required 6 hours to become cotton fiber free, the second sample required 3 hours to become cotton fiber free, and the third sample required only 30 minutes to become cotton fiber free.

It is believed that the invention has been described in such detail as to enable those skilled in the art to understand the same and it will be appreciated that variations may be made without departing from the spirit and scope of the invention.

What is claimed is:

1. A pigmented moisture curable coating composition which has an adjustable cure time and which, upon curing, forms a film having a blemish-free finish comprising:
   a pigment dispersion, the pigment dispersion comprising a pigment slurry, a tertiary amine catalyst and a first prepolymer reaction product, the first prepolymer reaction product comprising the reaction product of a polyisocyanate and a polyol, the first prepolymer reaction product exhibiting excess hydroxyl groups and the tertiary amine catalyst being present to promote elimination of the water from the dispersion and to promote the polyisocyanate and polyol reaction;
   a second isocyanate prepolymer, the second isocyanate preploymer comprising an excess of isocyanate groups capable of reacting with and consuming all of said hydroxyl groups on the first prepolymer and providing an excess of un-reacted isocyanate groups; and
   a blocked amine for limiting formation of gas bubbles in the coating during cure.

2. The composition of claim 1, wherein the pigment dispersion comprises about 2–70 percent by weight of the pigment, about 0.05–2.0 percent by weight the tertiary amine, and about 10–90 percent by weight of the first prepolymer reaction product, wherein the composition contains about 10–90 percent by weight the pigment dispersion and about 10–90 percent by weight the second isocyanate prepolymer.

3. The composition of claim 1, wherein the composition further includes a metal catalyst to modify the time for curing of the composition.

4. The composition of claim 3, wherein the composition further comprises less than 1 percent by weight of a metal catalyst, the metal catalyst selected from the group consisting of dibutyl tin dilaurate, dibutyl tin diacetate, dibutyl tin oxide, stannous octoate, zinc naphthanate, zinc octoate and iron (III) acetylacetonate.

5. The composition of claim 1, wherein the tertiary amine is selected from the group consisting of triethyl amine, N,N,N',N',N"-pentamethyldiethylenetriamine, and N,N,N', N'-tetramethyl-1,3-propanediamine.

6. The composition of claim 1, wherein the polyisocyanate of the first prepolymer reaction product is a diisocyanate and the polyol of the first prepolymer reaction product is a polyol having a functionality greater than 2.

7. The composition of claim 4, wherein the metal catalyst is dibutyl tin dilaurate.

8. The composition of claim 7, wherein the pigment is selected from the group consisting of titanium dioxide, iron oxides, organic complexes, talc and mica.

9. The composition of claim 8, wherein the pigment is titanium dioxide.

10. The composition of claim 9, wherein the composition is substantially free of acid, such that the acid number of the polyol and additives is less than 0.5.

11. The composition of claim 7, wherein the polyisocyanate of the first prepolymer reaction product is a diisocyanate and the polyol of the first prepolymer reaction product is a polycaprolactone polyol.

12. The composition of claim 1, wherein the blocked amine is selected from the group consisting of aldimines, ketimines and oxazolidines.

13. The composition of claim 1, wherein the composition further comprises a solvent.

14. The composition of claim 1, wherein the composition further comprises a non-ionic wetting agent.

15. The composition of claim 14, wherein the composition further comprises from about 0.5 to about 3.0 percent by total weight of the composition of the non-ionic wetting agent.

16. The composition of claim 1, wherein the composition further comprises a silicone fluid.

17. The composition of claim 1, wherein the composition further comprises a ultraviolet light stabilizer.

18. A method of producing a pigmented moisture curable coating composition which has an adjustable cure time and which, upon curing, has a gloss finish comprising the steps of:
   providing a pigment dispersion, the pigment dispersion comprising a pigment, a tertiary amine catalyst, a first prepolymer reaction product, the first prepolymer reaction product comprising the reaction product of a polyisocyanate and a polyol, the first prepolymer reaction product exhibiting excess hydroxyl groups and the tertiary amine catalyst being present to promote elimination of the water from the dispersion and to promote the polyisocyanate and polyol reaction; and reacting with the pigment dispersion a second isocyanate prepolymer in the presence of the tertiary amine catalyst, the second isocyanate prepolymer comprising an excess of isocyanate groups capable of reacting with and consuming all of said hydroxyl groups on the first propolymer and providing an excess of un-reacted isocyanate groups; and adding a blocked amine to produce a moisture curable coating composition.

19. The method of claim 18 wherein the pigment dispersion step further comprises testing the first prepolymer reaction product for moisture content.

20. The method of claim 18 wherein the pigment dispersion step further comprises testing the addition of a solvent.

21. The method of claim 18, wherein the pigment dispersion comprises about 2–70 percent by weight of the pigment, about 0.05–2.0 percent by weight the tertiary amine, and about 10–90 percent by weight of the first prepolymer reaction product, wherein the composition contains about 10–90 percent by weight the pigment dispersion and about 10–90 percent by weight the second isocyanate prepolymer.

22. The method of claim 18 wherein the blocked amine step further includes the addition of a metal catalyst.

23. The method of claim 22, wherein the composition further comprises less than 1 percent by weight of a metal catalyst, the metal catalyst selected from the group consisting of dibutyl tin dilaurate, dibutyl tin diacetate, stannous octoate, zinc naphthanate and iron (III) acetylacetonate.

24. The method of claim 18, wherein the tertiary amine is selected from the group consisting of triethyl amine, N,N,N',N',N"-pentamethyldiethylenetriamine, and N,N,N',N'-tetramethyl-1,3-propanediamine.

25. The method of claim 18, wherein the polyisocyanate of the first prepolymer reaction product is a diisocyanate and the polyol of the first prepolymer reaction product is a polyol having a functionality greater than 2.

26. The method of claim 23, wherein the metal catalyst is dibutyl tin dilaurate.

27. The method of claim 23, wherein the pigment is selected from the group consisting of titanium dioxide, iron oxides, organic complexes, talc and mica.

28. The method of claim 27, wherein the pigment is titanium dioxide.

29. The method of claim 18, wherein the composition is substantially free of acid, such that the acid number of the polyol and additives is less than 0.5.

30. The method of claim 23, wherein the polyisocyanate of the first prepolymer reaction product is a diisocyanate and the polyol of the first prepolymer reaction product is a polycaprolactone polyol.

31. The method of claim 18, wherein the pigment dispersion step further comprises the addition of a non-ionic wetting agent.

32. The method of claim 31, wherein the composition further comprises from about 0.5 to about 3.0 percent by total weight of the composition of the non-ionic wetting agent.

33. The method of claim 18, wherein the pigment dispersion step further comprises the addition of a silicone fluid.

34. The method of claim 18, wherein the pigment dispersion step further comprises the addition of an ultraviolet light stabilizer.

35. A pigmented moisture curable coating composition which has an adjustable cure time and which produces, upon curing, a film having a blemish-free finish comprising:
a moisture curing polyurethane coating comprising:
about 10 to 90 percent by weight of a pigment dispersion, the pigment dispersion comprising:
about 2–70 percent by weight of a pigment slurry,
about 10–90 percent by weight of a first prepolymer reaction product, the first prepolymer reaction product comprising the reaction product of a polyisocyanate and a polyol, the first prepolymer reaction product exhibiting excess hydroxyl groups, and
about 0.05–2 percent by weight of a tertiary amine catalyst to promote elimination of water from the pigment dispersion and to promote the polyisocyanate polyol reaction; and
about 10–90 percent by weight of a second isocyanate prepolymer, the second isocyanate preplomyer comprising an excess of isocyanate groups capable of reacting with and consuming all of said hydroxyl groups on the first prepolymer and providing an excess of un-reacted isocyanate groups; and
a blocked amine for limiting formation of gas bubbles in the coating during cure, the blocked amine being present in an amount of about 5–110 percent the stoicheometric amount of the polyurethane coating;
whereby, in the presence of atmospheric moisture, the coating cures to form a film with a pigmented, blemish-free finish.

36. The composition of claim 35, wherein the slurry further includes a solvent.

37. The composition of claim 35 further including a metal catalyst for adjusting the cure time selected from the group consisting of dibutyl tin dilaurate, dibutyl tin diacetate, stannous octoate, zinc naphthanate and iron (III) acetylacetonate.

38. The composition of claim 35, wherein the tertiary amine is selected from the group consisting of triethyl amine, N, N, N',N',N"-pentamethyldiethylenetriamine, and N,N,N',N'-tetramethyl-1,3-propanediamine.

39. The composition of claim 35, wherein the blocked amine is selected from the group consisting of aldimines, ketamines and oxzolidines.

40. A method of producing a pigmented moisture curable coating composition which produces, upon curing, a film having a blemish-free finish and which has an adjustable cure time comprising the steps of:
reacting a pigmented slurry with an excess of a monomeric polyisocyanate in the presence of a tertiary amine catalyst resulting in a color pigment dispersion;
reacting the color pigment dispersion with a polyol in the presence of the tertiary amine catalyst to form a first preploymer reaction product comprising long chain polyols having an excess of hydroxyl groups;
reacting the first prepolymer reaction product with a second isocyanate prepolymer in the presence of the tertiary amine catalyst, the second isocyanate prepolymer reacting with the hydroxyl groups resulting in a moisture curing polyurethane coating which is free of water; and
prior to application of the moisture curing polyurethane coating to a surface to be coated, adding a blocked amine to the coating to control the release of gas from the coating;
whereby, in the presence of atmospheric moisture, the coating cures to form a film with a pigmented, blemish-free finish.

41. The method of claim 40, further including addition of a solvent to the slurry and monomeric polyisocyanate reaction.

42. The method of claim 40, further including the step of adding a metal catalyst to adjust the cure rate, the metal catalyst being added subsequent to addition of the blocked amine and being selected from the group consisting of dibutyl tin dilaurate, dibutyl tin diacetate, stannous octoate, zinc naphthanate and iron (III) acetylacetonate.

43. The method of claim 40, wherein the tertiary amine is selected from the group consisting of triethyl amine, N,N, N',N',N"-pentamethyldiethylenetriamine, and N,N,N',N'-tetramethyl-1,3-propanediamine.

44. The method of claim 40, wherein the blocked amine is selected from the group consisting of aldimines, ketamines and oxazolidines.

* * * * *

UNITED STATES PATENT AND TRADEMARK OFFICE
CERTIFICATE OF CORRECTION

PATENT NO.  : 5,998,532
DATED       : December 7, 1999
INVENTOR(S) : Bhaskar R. Urs It is certified that error appears in the above-identified patent and that said Letters Patent is hereby corrected as shown below:

At column 5, line 14, indent the sentence in front of the word "Following" to denote the start of a new paragraph.

Signed and Sealed this

Twentieth Day of June, 2000

Attest:

Q. TODD DICKINSON

*Attesting Officer*                *Director of Patents and Trademarks*